US 11,988,855 B2

(12) United States Patent
Lin et al.

(10) Patent No.: US 11,988,855 B2
(45) Date of Patent: May 21, 2024

(54) OPTICAL FINGERPRINT SENSORS

(71) Applicant: VisEra Technologies Company Limited, Hsin-Chu (TW)

(72) Inventors: Ho-Tai Lin, Hsinchu (TW); Shin-Hong Chen, Taichung (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 8 days.

(21) Appl. No.: 16/451,130

(22) Filed: Jun. 25, 2019

(65) Prior Publication Data
US 2020/0410202 A1 Dec. 31, 2020

(51) Int. Cl.
G06V 40/13 (2022.01)
G02B 5/20 (2006.01)
G06V 40/12 (2022.01)

(52) U.S. Cl.
CPC ......... *G02B 5/201* (2013.01); *G06V 40/1318* (2022.01); *G06V 40/1394* (2022.01); *G02B 5/20* (2013.01)

(58) Field of Classification Search
CPC .... G06K 9/0012; G06K 9/0004; G06K 9/209; G02B 5/20
See application file for complete search history.

(56) References Cited

U.S. PATENT DOCUMENTS

| 2012/0187513 | A1* | 7/2012 | Holenarsipur | .... H01L 27/14621 257/432 |
| 2015/0381907 | A1* | 12/2015 | Boettiger | .......... H01L 27/14625 348/164 |
| 2016/0233365 | A1* | 8/2016 | Van Der Kolk | ...... H01L 31/055 |
| 2018/0005005 | A1* | 1/2018 | He | ........................ G06F 3/0418 |
| 2019/0019000 | A1* | 1/2019 | Lee | ............... G02B 5/20 |
| 2019/0087627 | A1 | 3/2019 | Ling et al. | |
| 2019/0180072 | A1* | 6/2019 | Fomani | .............. G06K 9/00046 |
| 2020/0104618 | A1* | 4/2020 | Yu | ........................... G06V 40/12 |
| 2020/0285345 | A1* | 9/2020 | Xiang | ................... G06F 3/0421 |
| 2020/0401782 | A1* | 12/2020 | Cheng | .................. G06K 9/0004 |

FOREIGN PATENT DOCUMENTS

| CN | 102609694 A | 7/2012 |
| CN | 107004126 A | 8/2017 |
| CN | 109409249 A | 3/2019 |
| JP | H-01158769 A | 6/1989 |
| JP | 2002042117 A | 2/2002 |
| JP | 2008091753 A | 4/2008 |

(Continued)

OTHER PUBLICATIONS

Office Action with the search report issued in corresponding TW application No. 108143106 dated Sep. 4, 2020.

(Continued)

Primary Examiner — Lixi C Simpson
(74) Attorney, Agent, or Firm — MUNCY, GEISSLER, OLDS & LOWE, PC

(57) ABSTRACT

An optical fingerprint sensor is provided. The optical fingerprint sensor includes a substrate, a light-shielding layer and an optical material layer. The light-shielding layer is disposed on the substrate. The optical material layer is in contact with the light-shielding layer. The optical material layer includes a non-filtering portion and a filtering portion.

9 Claims, 9 Drawing Sheets

(56) References Cited

FOREIGN PATENT DOCUMENTS

| | | |
|---|---|---|
| JP | 2009003821 A | 1/2009 |
| JP | 2010231336 A | 10/2010 |
| JP | 2011198855 A | 10/2011 |
| JP | 2014017468 A | 1/2014 |
| JP | 2015125663 A | 7/2015 |
| TW | 201545073 A | 12/2015 |

OTHER PUBLICATIONS

Office Action dated Jan. 26, 2021 in JP Application No. 2019-228926, 9 pages.
Office Action dated Apr. 22, 2021 in TW Application No. 108143106, 7 pages.

* cited by examiner

OPTICAL FINGERPRINT SENSORS

BACKGROUND OF THE INVENTION

Field of the Invention

The invention relates to an optical fingerprint sensor, and more particularly to an optical fingerprint sensor capable of identifying living signals.

Description of the Related Art

In conventional optical fingerprint sensors, after the sensor takes a photo of a fingerprint, optical images are compared to determine whether the fingerprint is correct. However, if a fake fingerprint photo, rather than the fingerprint from a living person, is applied, this can also pass the identification check, reducing the recognition rate and constituting a security risk.

Therefore, development of an optical fingerprint sensor with a living identification function is desirable.

BRIEF SUMMARY OF THE INVENTION

In accordance with one embodiment of the invention, an optical fingerprint sensor is provided. The optical fingerprint sensor includes a substrate, a light-shielding layer and an optical material layer. The light-shielding layer is disposed on the substrate. The optical material layer is in contact with the light-shielding layer. Specifically, the optical material layer includes a non-filtering portion and a filtering portion.

In some embodiments, the substrate includes a plurality of photoelectric conversion units. In some embodiments, the light-shielding layer further includes a plurality of through holes. The through holes align with the photoelectric conversion units.

In some embodiments, the optical material layer is disposed between the substrate and the light-shielding layer. In some embodiments, the optical material layer is disposed on the light-shielding layer. In some embodiments, the light-shielding layer includes an upper portion and a lower portion, and the upper portion is separated from the lower portion by the optical material layer.

In some embodiments, the photoelectric conversion units corresponding to the non-filtering portion detect living signals. In some embodiments, the photoelectric conversion units corresponding to the filtering portion detect fingerprint signals.

In some embodiments, the non-filtering portion has an area that is substantially equal to that of the filtering portion, and the non-filtering portion and the filtering portion are arranged in a direction which is parallel to a longitudinal axis of the substrate. In some embodiments, the non-filtering portion has an area that is substantially equal to that of the filtering portion, and the non-filtering portion and the filtering portion are arranged in a direction which is perpendicular to a longitudinal axis of the substrate.

In some embodiments, the non-filtering portion includes a plurality of separated sub-portions arranged in a matrix and surrounded by the filtering portion. In some embodiments, the non-filtering portion includes a plurality of separated sub-portions arranged in a staggered manner and surrounded by the filtering portion. In some embodiments, the filtering portion includes a plurality of separated sub-portions arranged in a matrix and surrounded by the non-filtering portion. In some embodiments, the filtering portion includes a plurality of separated sub-portions arranged in a staggered manner and surrounded by the non-filtering portion.

In some embodiments, the filtering portion is surrounded by the non-filtering portion. In some embodiments, the non-filtering portion is surrounded by the filtering portion.

In some embodiments, the filtering portion includes a first sub-portion and a second sub-portion, the non-filtering portion includes a first sub-portion and a second sub-portion, the first sub-portion of the filtering portion is surrounded by the first sub-portion of the non-filtering portion, the first sub-portion of the non-filtering portion is surrounded by the second sub-portion of the filtering portion, and the second sub-portion of the filtering portion is surrounded by the second sub-portion of the non-filtering portion. In some embodiments, the filtering portion includes a first sub-portion and a second sub-portion, the non-filtering portion includes a first sub-portion and a second sub-portion, the first sub-portion of the non-filtering portion is surrounded by the first sub-portion of the filtering portion, the first sub-portion of the filtering portion is surrounded by the second sub-portion of the non-filtering portion, and the second sub-portion of the non-filtering portion is surrounded by the second sub-portion of the filtering portion.

In some embodiments, the filtering portion includes an IR cut filter, a red color filter, a green color filter or a blue color filter. In some embodiments, the non-filtering portion includes transparent organic materials. In some embodiments, the optical fingerprint sensor further includes a first light source disposed over the light-shielding layer. In some embodiments, the first light source includes an OLED. In some embodiments, the optical fingerprint sensor further includes a second light source disposed adjacent to the first light source. In some embodiments, the second light source includes an IR LED.

In the present invention, the specific and appropriate distribution patterns (for example, shown in FIGS. 2, 3 and 5-12) are presented by disposing the optical material layer (i.e. the combination of the non-filtering portion and the filtering portion) on an appropriate location (for example, the optical material layer is disposed between the substrate and the light-shielding layer, the optical material layer is disposed on the light-shielding layer, or the optical material layer is disposed between the upper portion and the lower portion of the light-shielding layer) in the optical fingerprint sensor. When light passes through the optical material layer, the photoelectric conversion units corresponding to the non-filtering portion and the filtering portion respectively receive the signals of IR and visible light to determine the correct fingerprint and whether it is from a living being by optimal quality of signal comparison. The present invention can be widely applied to the optical fingerprint identification of various electronic devices, for example mobile phones. Compared with the traditional fingerprint identification system, the present invention improves the living identification function and the recognition correctness rate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
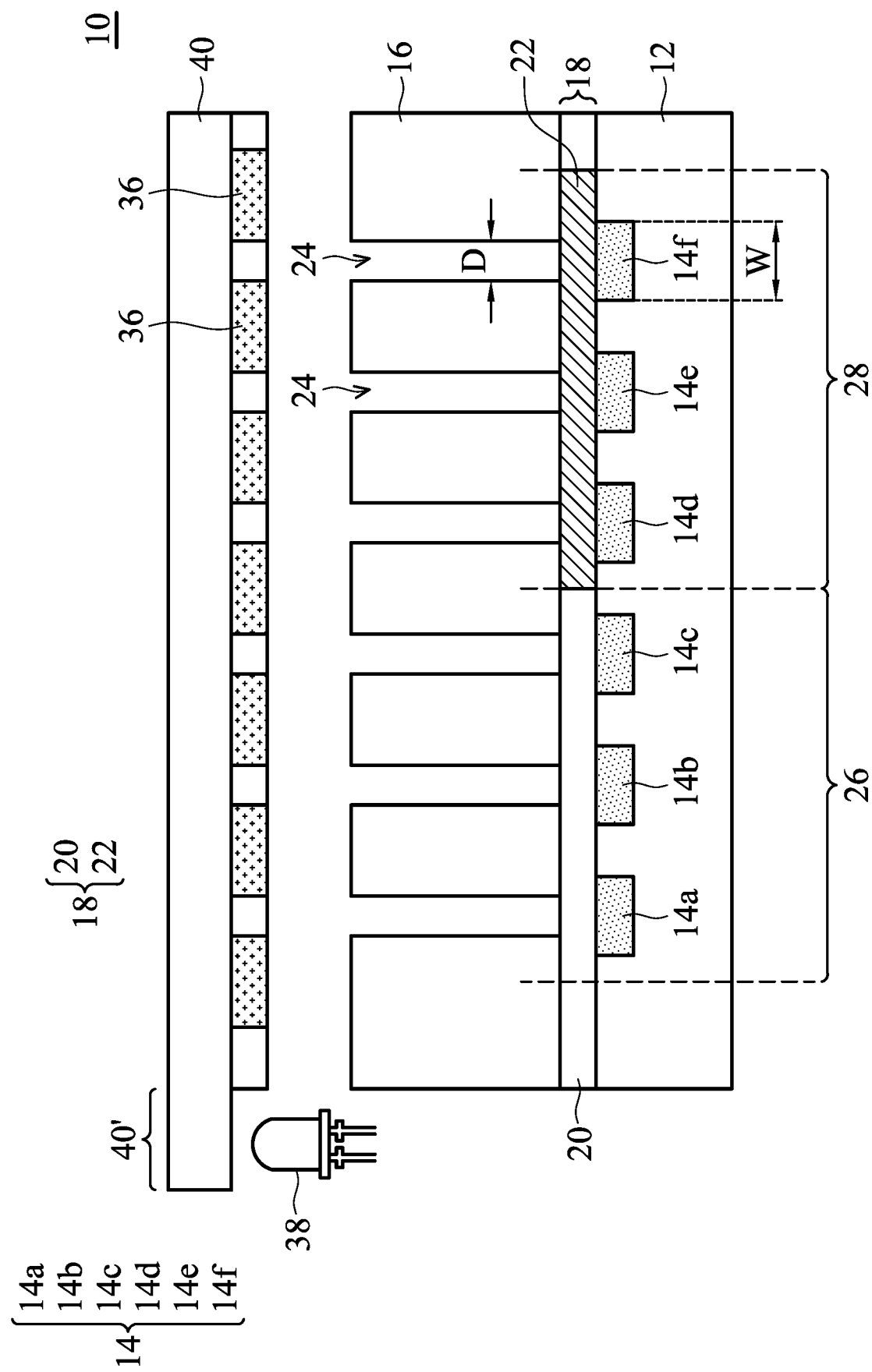
FIG. 1 is a cross-sectional view of an optical fingerprint sensor in accordance with one embodiment of the invention.

Referring to FIG. 1, in accordance with one embodiment of the invention, an optical fingerprint sensor 10 is provided. FIG. 1 shows a cross-sectional view of the optical fingerprint sensor 10.

In FIG. 1, the optical fingerprint sensor 10 includes a substrate 12, a plurality of photoelectric conversion units 14, a light-shielding layer 16 and an optical material layer 18. The photoelectric conversion units 14, for example, a first photoelectric conversion unit 14a, a second photoelectric conversion unit 14b, a third photoelectric conversion unit 14c, a fourth photoelectric conversion unit 14d, a fifth photoelectric conversion unit 14e and a sixth photoelectric conversion unit 14f, are disposed in the substrate 12. The light-shielding layer 16 is disposed on the substrate 12. The optical material layer 18 is in contact with the light-shielding layer 16. For example, the optical material layer 18 is "physically (or directly)" in contact with the light-shielding layer 16. Specifically, the optical material layer 18 includes one non-filtering portion 20 and one filtering portion 22.

In some embodiments, the substrate 12 includes, for example, silicon or another appropriate semiconductor material. In some embodiments, the photoelectric conversion units 14 include appropriate components capable of converting light into electrical signals, for example, various photodiodes (PDs). In some embodiments, the light-shielding layer 16 includes, for example, appropriate opaque organic material or inorganic material. In FIG. 1, the light-shielding layer 16 further includes a plurality of through holes 24 formed therein. The through holes 24 align with the photoelectric conversion units 14. In some embodiments, the diameter D of the through hole 24 is an appropriate size, for example, less than or equal to the width W of the photoelectric conversion unit 14. Here, the light-shielding layer 16 is considered as a "collimator" to allow light to pass through at a specific angle.

In FIG. 1, the optical material layer 18 is disposed between the substrate 12 and the light-shielding layer 16. In some embodiments, the non-filtering portion 20 of the optical material layer 18 includes, for example, appropriate transparent organic material. In some embodiments, the filtering portion 22 of the optical material layer 18 includes, for example, an IR cut filter, a red (R) color filter, a green (G) color filter or a blue (B) color filter. In some embodiments, the filtering portion 22 includes, for example, an absorption-type material or a reflection-type material. In some embodiments, the filtering portion 22 includes, for example, single layer or multiple layers. Here, the filtering portion 22 is used to filter out IR and for visible light to pass through.

The non-filtering portion 20 and the filtering portion 22 of the optical material layer 18 overly some photoelectric conversion units 14 respectively. In FIG. 1, the non-filtering portion 20 overlies the specific photoelectric conversion units 14, for example, the first photoelectric conversion unit 14a, the second photoelectric conversion unit 14b and the third photoelectric conversion unit 14c. The filtering portion 22 overlies the specific photoelectric conversion units 14, for example, the fourth photoelectric conversion unit 14d, the fifth photoelectric conversion unit 14e and the sixth photoelectric conversion unit 14f. Specifically, the non-filtering portion 20 and the specific photoelectric conversion units 14 (i.e. the first photoelectric conversion unit 14a, the second photoelectric conversion unit 14b and the third photoelectric conversion unit 14c) underneath the non-filtering portion 20 constitute one first detection region 26 for detecting living signals which belong to the IR range, for example, a vein signal at a wavelength of 940 nm. The filtering portion 22 and the specific photoelectric conversion units 14 (i.e. the fourth photoelectric conversion unit 14d, the fifth photoelectric conversion unit 14e and the sixth photoelectric conversion unit 14f) underneath the filtering portion 22 constitute one second detection region 28 for detecting fingerprint signals which belong to the visible-light range.

Figure 2:
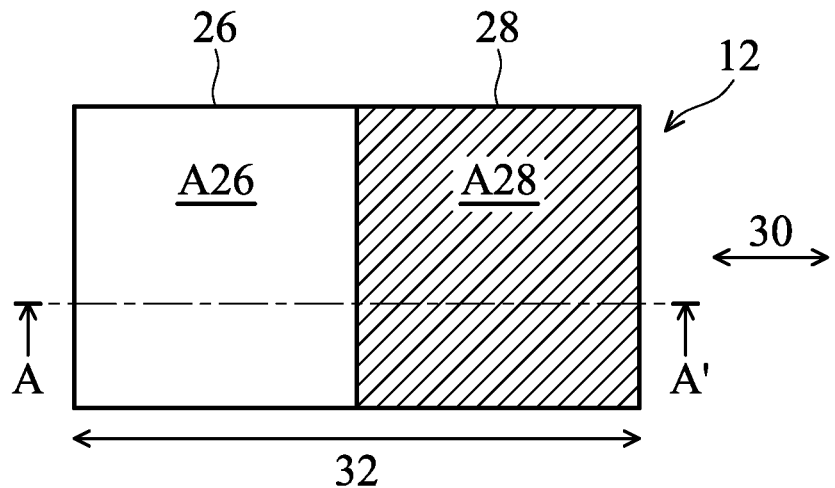
FIG. 2 is a top view of a part of an optical fingerprint sensor in accordance with one embodiment of the invention.

In accordance with a top view (FIG. 2) of the optical material layer 18 (including the non-filtering portion 20 and the filtering portion 22), the distribution pattern of the first detection region 26 and second detection region 28 of the substrate 12 will be more clearly revealed. The cross-sectional profile of the optical material layer 18 in FIG. 1 is obtained along a section line A-A' of FIG. 2. In FIG. 2, the area A26 of the first detection region 26 is substantially equal to the area A28 of the second detection region 28. The first detection region 26 and the second detection region 28 are arranged in a direction 30 which is parallel to a longitudinal axis 32 of the substrate 12.

Figure 3:
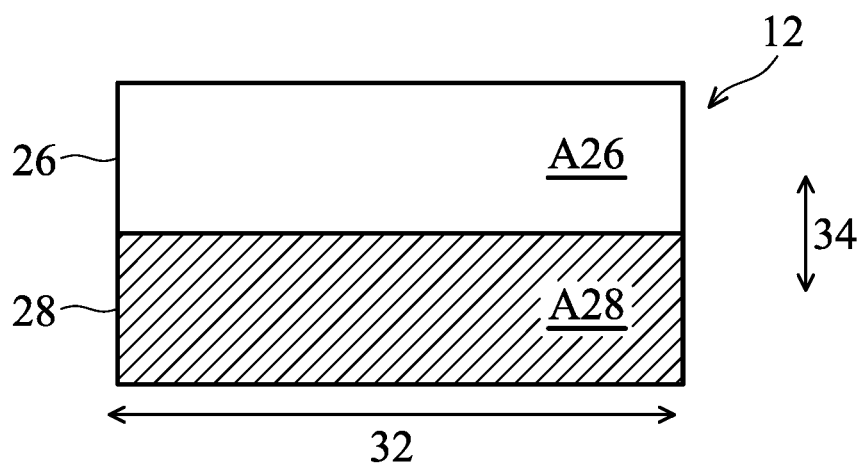
FIG. 3 is a top view of a part of an optical fingerprint sensor in accordance with one embodiment of the invention.

In some embodiments, other appropriate distribution patterns of the first detection region 26 and second detection region 28 are also revealed, as shown in FIG. 3. In FIG. 3, the area A26 of the first detection region 26 is substantially equal to the area A28 of the second detection region 28. The first detection region 26 and the second detection region 28 are arranged in a direction 34 which is perpendicular to the longitudinal axis 32 of the substrate 12. In some embodiments, other appropriate distribution patterns of the first detection region 26 and second detection region 28 are also revealed (not shown), for example, the area of the first detection region is different from that of the second detection region, or the first detection region and the second detection region are arranged diagonally on the substrate.

In FIG. 1, the optical fingerprint sensor 10 further includes a first light source 36 disposed over the light-shielding layer 16. In some embodiments, the first light source 36 includes, for example, an OLED array. In some embodiments, the first light source 36 emits, for example, visible light having a wavelength range from about 400 nm to about 700 nm, or IR having a wavelength range from about 700 nm to about 1,100 nm, for example, 850 nm or 940 nm. The optical fingerprint sensor 10 further includes a second light source 38 disposed adjacent to the first light source 36. In some embodiments, the second light source 38 includes, for example, an IR LED. In some embodiments, the second light source 38 emits, for example, IR having a wavelength range from about 700 nm to about 1,100 nm, for example, 850 nm or 940 nm. The optical fingerprint sensor 10 further includes a cover glass 40 disposed over the first light source 36 and the second light source 38. Here, the second light source 38 is located underneath the edge 40' of the cover glass 40. In some embodiments, the first light source 36 and the second light source 38 emit light simultaneously. In some embodiments, the first light source 36 and the second light source 38 emit light sequentially. For example, the first light source 36 first emits, followed by the second light source 38, or the second light source 38 first emits, followed by the first light source 36.

When a living finger (not shown) touches the cover glass 40, the first light source 36 (i.e. an OLED array) first emits visible light, for example, at a wavelength of 660 nm, and then the second light source 38 (i.e. an IR LED) emits IR, for example, at a wavelength of 940 nm. The emitted visible light and IR are totally reflected in the cover glass 40, and then the light is reflected by the finger to the detection regions. The detection regions receive these optical signals and convert them to electrical signals for image comparison. The second detection region 28 configured with the filtering portion 22 of the optical material layer 18 therein receives the signals (ex. 660 nm) of visible light for comparison to determine if it is the correct fingerprint. Simultaneously, if the first detection region 26 configured with the non-filtering portion 20 of the optical material layer 18 therein receives IR signals (ex. 940 nm; a vein signal), it means the fingerprint being tested is from a living being.

Figure 4:
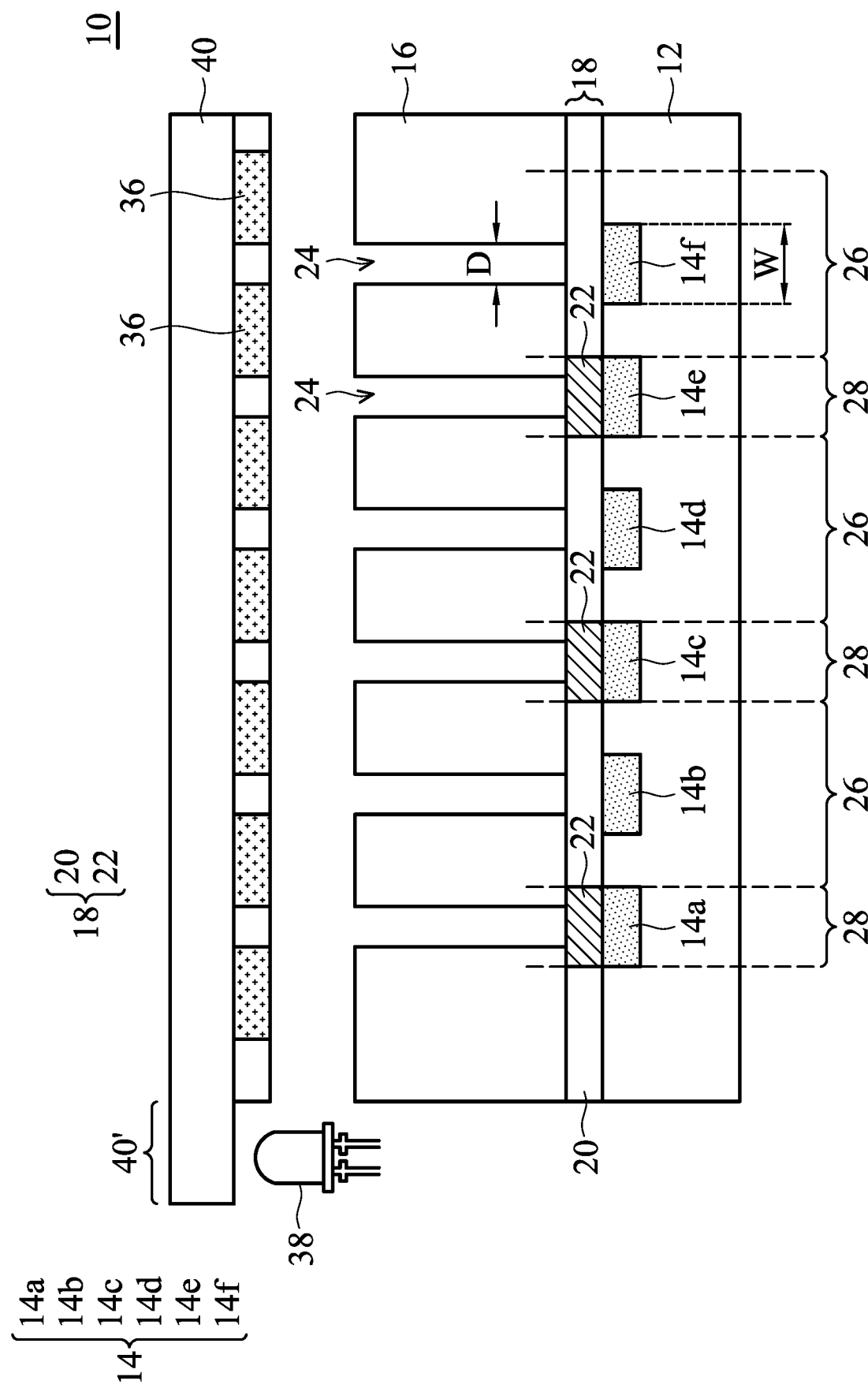
FIG. 4 is a cross-sectional view of an optical fingerprint sensor in accordance with one embodiment of the invention.

Referring to FIG. 4, in accordance with one embodiment of the invention, an optical fingerprint sensor 10 is provided. FIG. 4 shows a cross-sectional view of the optical fingerprint sensor 10.

In FIG. 4, the optical fingerprint sensor 10 includes a substrate 12, a plurality of photoelectric conversion units 14, a light-shielding layer 16 and an optical material layer 18. The photoelectric conversion units 14, for example, a first photoelectric conversion unit 14a, a second photoelectric conversion unit 14b, a third photoelectric conversion unit 14c, a fourth photoelectric conversion unit 14d, a fifth photoelectric conversion unit 14e and a sixth photoelectric conversion unit 14f, are disposed in the substrate 12. The light-shielding layer 16 is disposed on the substrate 12. The optical material layer 18 is in contact with the light-shielding layer 16. For example, the optical material layer 18 is "physically (or directly)" in contact with the light-shielding layer 16. Specifically, the optical material layer 18 includes one non-filtering portion 20 and a plurality of filtering portions 22.

In some embodiments, the substrate 12 includes, for example, silicon or another appropriate semiconductor material. In some embodiments, the photoelectric conversion units 14 include appropriate components capable of converting light into electrical signals, for example, various photodiodes (PDs). In some embodiments, the light-shielding layer 16 includes, for example, appropriate opaque organic material or inorganic material. In FIG. 4, the light-shielding layer 16 further includes a plurality of through holes 24 formed therein. The through holes 24 align with the photoelectric conversion units 14. In some embodiments, the diameter D of the through hole 24 is an appropriate size, for example, less than or equal to the width W of the photoelectric conversion unit 14. Here, the light-shielding layer 16 is considered as a "collimator" to allow light to pass through at a specific angle.

In FIG. 4, the optical material layer 18 is disposed between the substrate 12 and the light-shielding layer 16. In some embodiments, the non-filtering portion 20 of the optical material layer 18 includes, for example, appropriate transparent organic material. In some embodiments, the filtering portion 22 of the optical material layer 18 includes, for example, an IR cut filter, a red (R) color filter, a green (G) color filter or a blue (B) color filter. In some embodiments, the filtering portion 22 includes, for example, an absorption-type material or a reflection-type material. In some embodiments, the filtering portion 22 includes, for example, single layer or multiple layers. Here, the filtering portion 22 is used to filter out IR and for visible light to pass through.

The non-filtering portion 20 and the filtering portions 22 of the optical material layer 18 overly some photoelectric conversion units 14 respectively. In FIG. 4, the non-filtering portion 20 overlies the specific photoelectric conversion units 14, for example, the second photoelectric conversion unit 14b, the fourth photoelectric conversion unit 14d and the sixth photoelectric conversion unit 14f. The filtering portions 22 overly the specific photoelectric conversion units 14, for example, the first photoelectric conversion unit 14a, the third photoelectric conversion unit 14c and the fifth photoelectric conversion unit 14e. Specifically, the non-filtering portion 20 and the specific photoelectric conversion units 14 (i.e. the second photoelectric conversion unit 14b, the fourth photoelectric conversion unit 14d and the sixth photoelectric conversion unit 14f) underneath the non-filtering portion 20 constitute one first detection region 26 for detecting living signals which belong to the IR range, for example, a vein signal at a wavelength of 940 nm. The filtering portions 22 and the specific photoelectric conversion units 14 (i.e. the first photoelectric conversion unit 14a, the third photoelectric conversion unit 14c and the fifth photoelectric conversion unit 14e) underneath the filtering portions 22 constitute a plurality of second detection regions 28 for detecting fingerprint signals which belong to the visible-light range.

Figure 5:
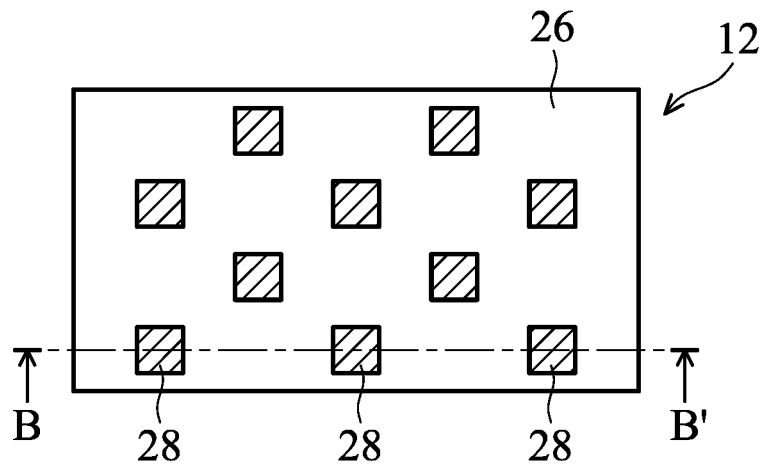
FIG. 5 is a top view of a part of an optical fingerprint sensor in accordance with one embodiment of the invention.

In accordance with a top view (FIG. 5) of the optical material layer 18 (including the non-filtering portion 20 and the filtering portion 22), the distribution pattern of the first detection region 26 and second detection regions 28 of the substrate 12 will be more clearly revealed. The cross-sectional profile of the optical material layer 18 in FIG. 4 is obtained along a section line B-B' of FIG. 5. In FIG. 5, the second detection regions 28 are arranged in a "staggered" manner and surrounded by the first detection region 26. In some embodiments, the sizes (i.e. area) of the second detection regions are the same or different from each other.

Figure 6:
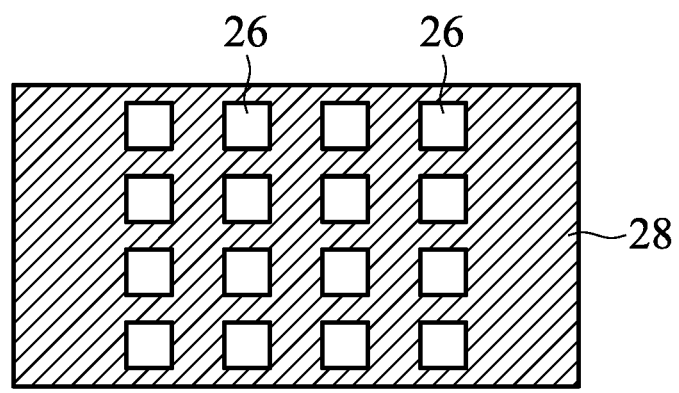
FIG. 6 is a top view of a part of an optical fingerprint sensor in accordance with one embodiment of the invention.
Figure 7:
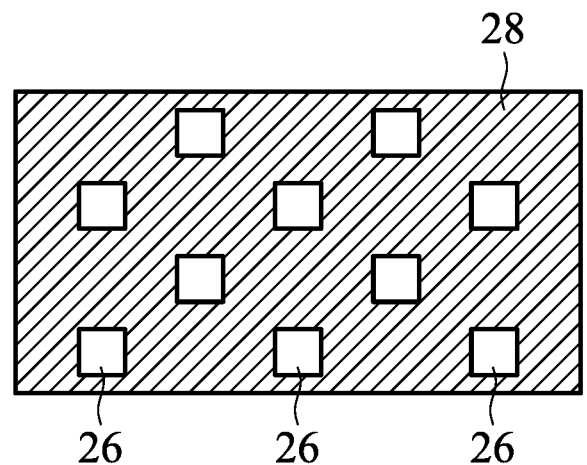
FIG. 7 is a top view of a part of an optical fingerprint sensor in accordance with one embodiment of the invention.
Figure 8:
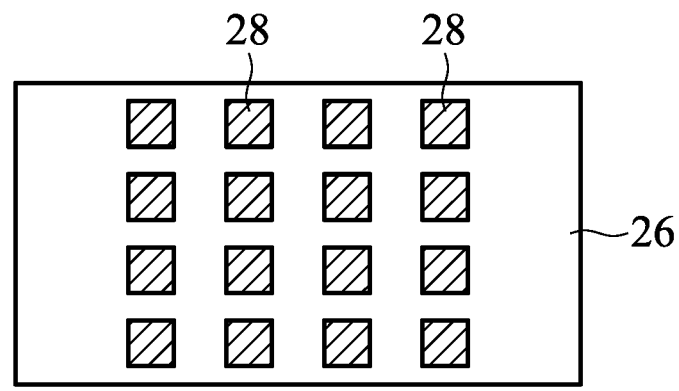
FIG. 8 is a top view of a part of an optical fingerprint sensor in accordance with one embodiment of the invention.

In some embodiments, other appropriate distribution patterns of the first detection region 26 and second detection region 28 are also revealed, as shown in FIGS. 6-8. In FIG. 6, the plurality of first detection regions 26 are arranged in a "matrix" and surrounded by the second detection region 28. In some embodiments, the sizes (i.e. area) of the first detection regions are the same or different from each other. In FIG. 7, the plurality of first detection regions 26 are arranged in a "staggered" manner and surrounded by the second detection region 28. In some embodiments, the sizes (i.e. area) of the first detection regions are the same or different from each other. In FIG. 8, the plurality of second detection regions 28 are arranged in a "matrix" and surrounded by the first detection region 26. In some embodiments, the sizes (i.e. area) of the second detection regions are the same or different from each other.

In FIG. 4, the optical fingerprint sensor 10 further includes a first light source 36 disposed over the light-shielding layer 16. In some embodiments, the first light source 36 includes, for example, an OLED array. In some embodiments, the first light source 36 emits, for example, visible light having a wavelength range from about 400 nm to about 700 nm, or IR having a wavelength range from about 700 nm to about 1,100 nm, for example, 850 nm or 940 nm. The optical fingerprint sensor 10 further includes a second light source 38 disposed adjacent to the first light source 36. In some embodiments, the second light source 38 includes, for example, an IR LED. In some embodiments, the second light source 38 emits, for example, IR having a wavelength range from about 700 nm to about 1,100 nm, for example, 850 nm or 940 nm. The optical fingerprint sensor 10 further includes a cover glass 40 disposed over the first light source 36 and the second light source 38. Here, the second light source 38 is located underneath the edge 40' of the cover glass 40. In some embodiments, the first light source 36 and the second light source 38 emit light simultaneously. In some embodiments, the first light source 36 and the second light source 38 emit light sequentially. For example, the first light source 36 first emits, followed by the second light source 38, or the second light source 38 first emits, followed by the first light source 36.

When a living finger (not shown) touches the cover glass 40, the first light source 36 (i.e. an OLED array) first emits visible light, for example, at a wavelength of 660 nm, and then the second light source 38 (i.e. an IR LED) emits IR, for example, at a wavelength of 940 nm. The emitted visible light and IR are totally reflected in the cover glass 40, and then the light is reflected by the finger to the detection regions. The detection regions receive these optical signals and convert them to electrical signals for image comparison. The second detection region 28 configured with the filtering portion 22 of the optical material layer 18 therein receives the signals (ex. 660 nm) of visible light for comparison to determine if it is the correct fingerprint. Simultaneously, if the first detection region 26 configured with the non-filtering portion 20 of the optical material layer 18 therein receives IR signals (ex. 940 nm; a vein signal), it means the fingerprint being tested is from a living being.

In some embodiments, other appropriate distribution patterns of the first detection region 26 and second detection region 28 are also revealed, as shown in FIGS. 9-12.

Figure 9:
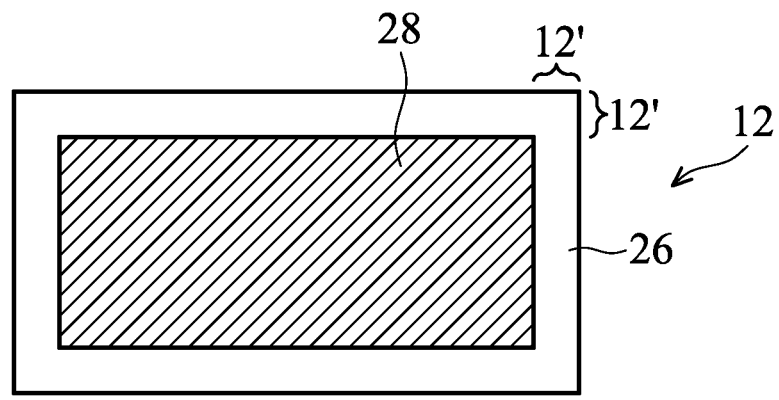
FIG. 9 is a top view of a part of an optical fingerprint sensor in accordance with one embodiment of the invention.
Figure 10:
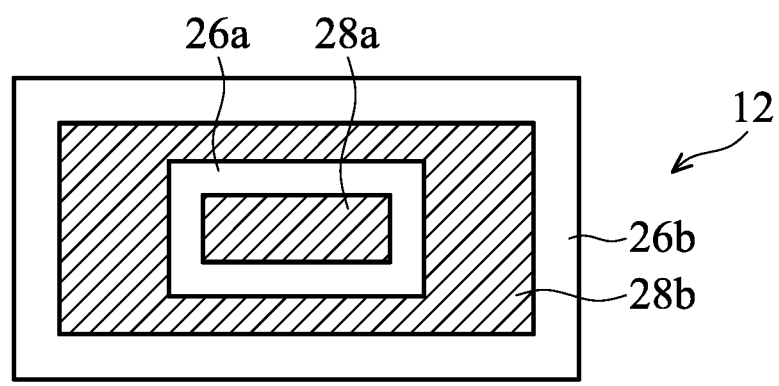
FIG. 10 is a top view of a part of an optical fingerprint sensor in accordance with one embodiment of the invention.
Figure 11:
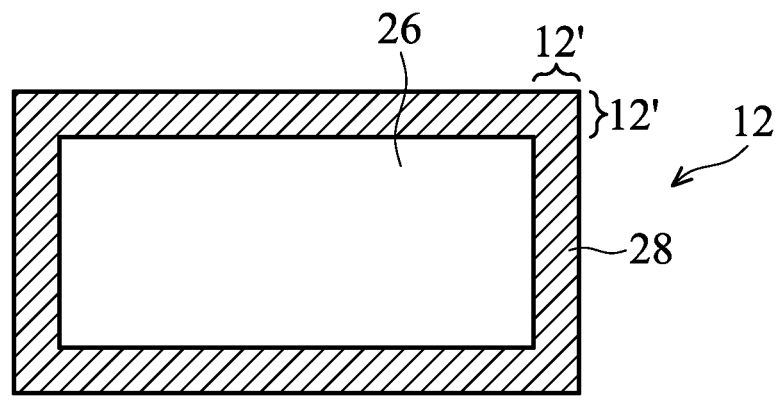
FIG. 11 is a top view of a part of an optical fingerprint sensor in accordance with one embodiment of the invention.
Figure 12:
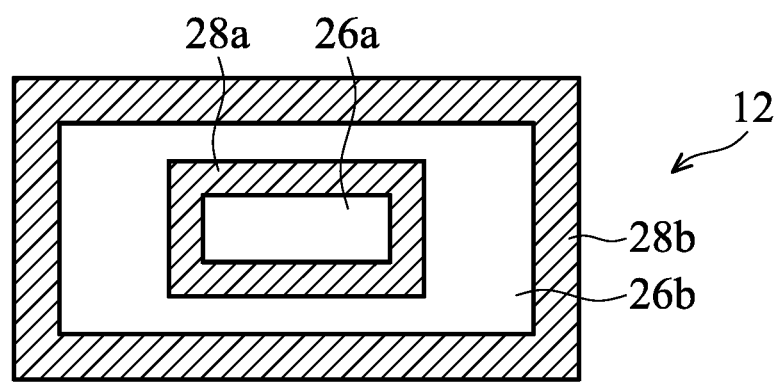
FIG. 12 is a top view of a part of an optical fingerprint sensor in accordance with one embodiment of the invention.

In FIG. 9, the second detection region 28 is surrounded by the first detection region 26. The first detection region 26 extends along the edge 12' of the substrate 12. In some embodiments, a part of the second detection region is surrounded by the first detection region. In FIG. 10, there are two first detection regions (26a and 26b) and two second detection regions (28a and 28b) arranged on the substrate 12. The second detection region 28a is surrounded by the first detection region 26a. The first detection region 26a is surrounded by the second detection region 28b. The second detection region 28b is surrounded by the first detection region 26b. In FIG. 11, the first detection region 26 is surrounded by the second detection region 28. The second detection region 28 extends along the edge 12' of the substrate 12. In some embodiments, a part of the first detection region is surrounded by the second detection region. In FIG. 12, there are two first detection regions (26a and 26b) and two second detection regions (28a and 28b) arranged on the substrate 12. The first detection region 26a is surrounded by the second detection region 28a. The second detection region 28a is surrounded by the first detection region 26b. The first detection region 26b is surrounded by the second detection region 28b. In some embodiments, other appropriate distribution patterns of the first detection region 26 and second detection region 28 are also revealed. The focus is on achieving optimal quality of signal comparison with different distribution patterns of the first detection region 26 and second detection region 28.

Figure 13:
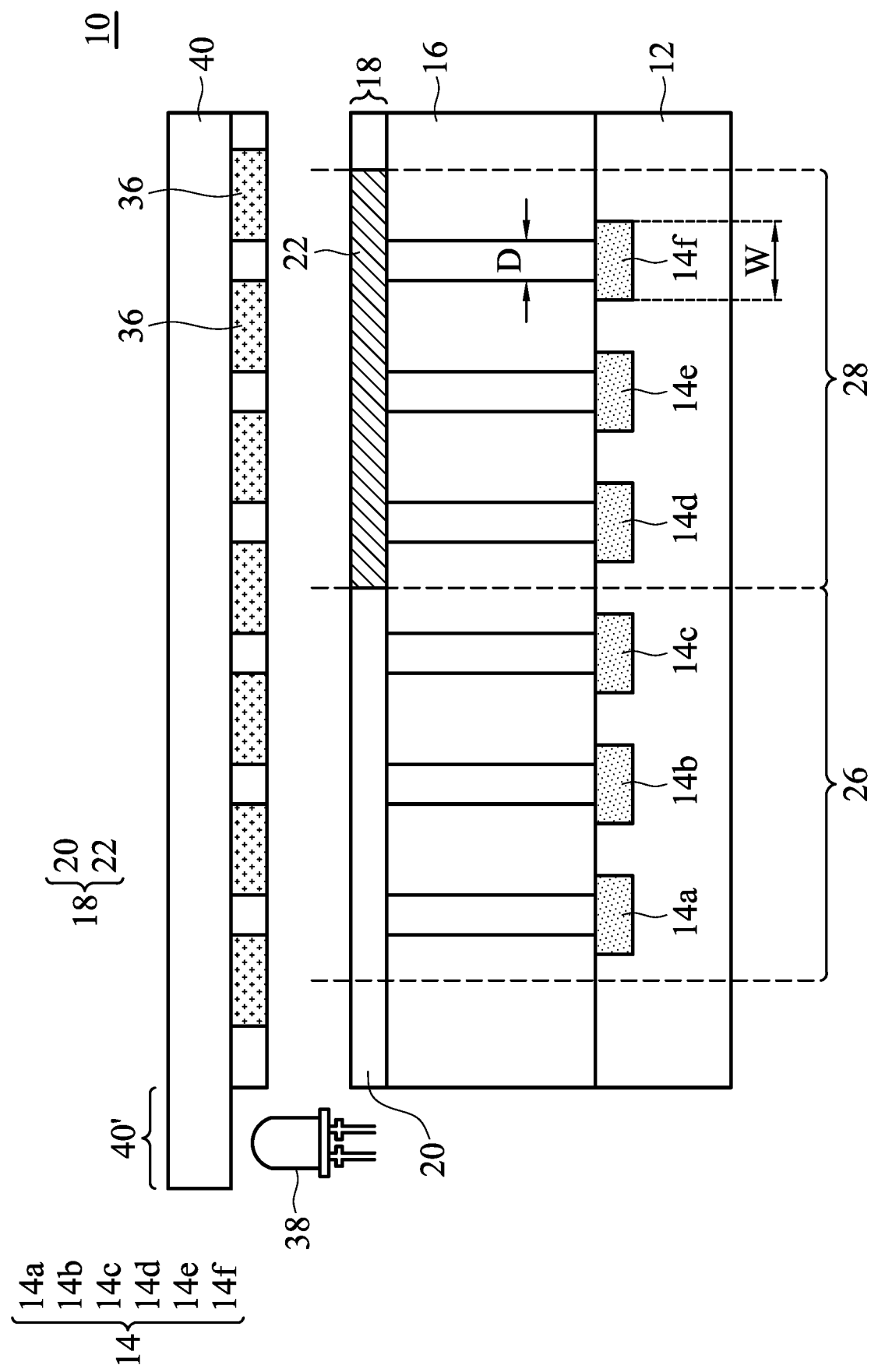
FIG. 13 is a cross-sectional view of an optical fingerprint sensor in accordance with one embodiment of the invention.
Figure 14:
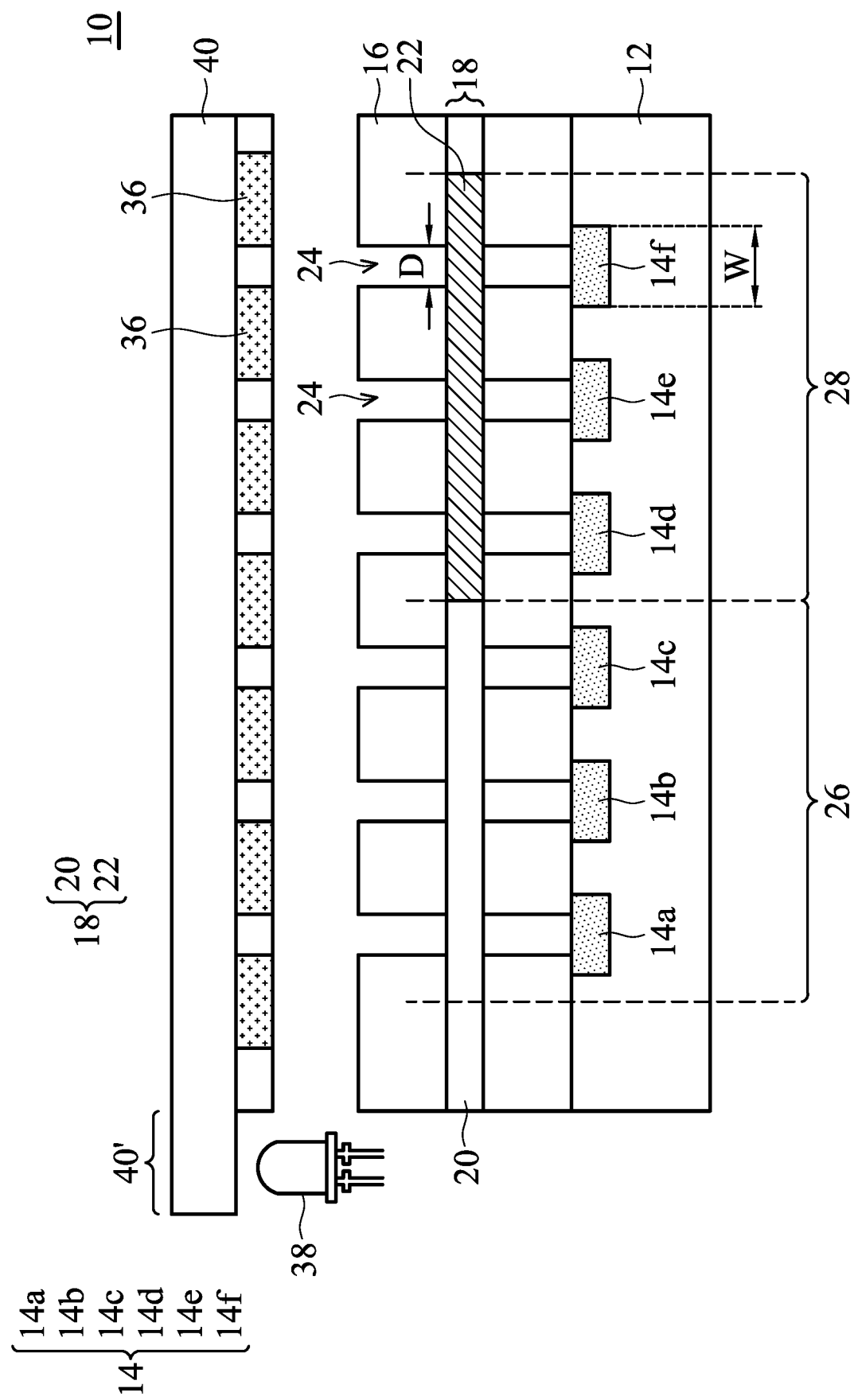
FIG. 14 is a cross-sectional view of an optical fingerprint sensor in accordance with one embodiment of the invention.

In FIG. 1, the optical material layer 18 is disposed between the substrate 12 and the light-shielding layer 16. Other appropriate locations for the optical material layer 18 in the optical fingerprint sensor 10 are also revealed in some embodiments. For example, the optical material layer 18 is disposed on the light-shielding layer 16, as shown in FIG. 13, or the optical material layer 18 is inserted into the light-shielding layer 16 (i.e. the upper portion and the lower portion of the light-shielding layer 16 are separated by the optical material layer 18), as shown in FIG. 14. The point is that a filtering effect is produced by the optical material layer (i.e. the combination of the non-filtering portion and the filtering portion) disposed on an appropriate location in the optical fingerprint sensor before light signals reach the photoelectric conversion units to determine the correct fingerprint and whether it is from a living being.

In the present invention, the specific and appropriate distribution patterns (for example, shown in FIGS. 2, 3 and 5-12) of the first detection region and second detection region are presented by disposing the optical material layer (i.e. the combination of the non-filtering portion and the filtering portion) on an appropriate location (for example, the optical material layer is disposed between the substrate and the light-shielding layer, the optical material layer is disposed on the light-shielding layer, or the optical material layer is inserted into the light-shielding layer) in the optical fingerprint sensor. When light passes through the optical material layer, the first detection region and second detection region respectively receive the signals of IR and visible light to determine the correct fingerprint and whether it is from a living being by optimal quality of signal comparison. The present invention can be widely applied to the optical fingerprint identification of various electronic devices, for example mobile phones. Compared with the traditional fingerprint identification system, the present invention improves the living identification function and the recognition correctness rate.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical fingerprint sensor, comprising:
   a substrate;
   a plurality of photoelectric conversion units disposed within the substrate;

a light-shielding layer disposed on the substrate, the light-shielding layer comprising a plurality of through holes extending from a top surface of the light-shielding layer to a bottom of the light-shielding layer, each of the plurality of photoelectric conversion units being aligned with one of the plurality of through holes;

an optical material layer in contact with the light-shielding layer, wherein the optical material layer comprises a non-filtering portion and a filtering portion, the filtering portion comprising an IR cut filter, a red color filter, a green color filter or a blue color filter and the non-filtering portion comprising transparent organic materials;

a glass cover;

a first light source disposed over the light-shielding layer, wherein the first light source comprises an OLED array, the first light source disposed under the glass cover; and a second light source disposed adjacent to and separate from an end of the first light source, wherein the second light source comprises an IR LED, the second light source disposed under and edge of the glass cover, wherein the filtering portion comprises a plurality of separated sub-portions, arranged in rows and columns such that the sub-portions in adjacent rows and columns are aligned with each other, and each of the separated sub-portions is entirely surrounded by the non-filtering portion.

2. The optical fingerprint sensor as claimed in claim 1, wherein the optical material layer is disposed between the substrate and the light-shielding layer.

3. The optical fingerprint sensor as claimed in claim 1, wherein the optical material layer is disposed on the light-shielding layer.

4. The optical fingerprint sensor as claimed in claim 1, wherein the light-shielding layer comprises an upper portion and a lower portion, and the upper portion is separated from the lower portion by the optical material layer.

5. The optical fingerprint sensor as claimed in claim 1, wherein the photoelectric conversion units corresponding to the non-filtering portion detect living signals, and the photoelectric conversion units corresponding to the filtering portion detect fingerprint signals.

6. The optical fingerprint sensor as claimed in claim 1, wherein each of the separated sub-portions is entirely surrounded by the non-filtering portion and directly contacts the non-filtering portion.

7. The optical fingerprint sensor as claimed in claim 1, wherein each of the separated sub-portions is embedded within and entirely surrounded by the non-filtering portion.

8. An optical fingerprint sensor, comprising:
a substrate;
a plurality of photoelectric conversion units disposed within the substrate;
a light-shielding layer disposed on the substrate, the light-shielding layer comprising a plurality of through holes extending from a top surface of the light-shielding layer to a bottom of the light-shielding layer, each of the plurality of photoelectric conversion units being aligned with one of the plurality of through holes;

an optical material layer in contact with the light-shielding layer, wherein the optical material layer comprises a non-filtering portion and a filtering portion, the filtering portion comprising an IR cut filter, a red color filter, a green color filter or a blue color filter and the non-filtering portion comprising transparent organic materials;

a glass cover;

a first light source disposed over the light-shielding layer, wherein the first light source comprises an OLED array, the first light source disposed under the glass cover; and a second light source disposed adjacent to and separate from an end of the first light source, wherein the second light source comprises an IR LED, the second light source disposed under and edge of the glass cover, and wherein the non-filtering portion comprises a plurality of separated sub-portions arranged in a matrix and each of the separated sub-portions is entirely surrounded by the filtering portion.

9. An optical fingerprint sensor, comprising:
a substrate;
a plurality of photoelectric conversion units disposed within the substrate;
a light-shielding layer disposed on the substrate, the light-shielding layer comprising a plurality of through holes extending from a top surface of the light-shielding layer to a bottom of the light-shielding layer, each of the plurality of photoelectric conversion units being aligned with one of the plurality of through holes;

an optical material layer in contact with the light-shielding layer, wherein the optical material layer comprises a non-filtering portion and a filtering portion, the filtering portion comprising an IR cut filter, a red color filter, a green color filter or a blue color filter and the non-filtering portion comprising transparent organic materials;

a glass cover;

a first light source disposed over the light-shielding layer, wherein the first light source comprises an OLED array, the first light source disposed under the glass cover; and a second light source disposed adjacent to and separate from an end of the first light source, wherein the second light source comprises an IR LED, the second light source disposed under and edge of the glass cover, wherein the non-filtering portion comprises a plurality of separated sub-portions, arranged in rows and columns which are staggered such that adjacent rows and columns are offset, and surrounded by the filtering portion, or wherein the filtering portion comprises a first sub-portion and a second sub-portion, the non-filtering portion comprises a first sub-portion and a second sub-portion, the first sub-portion of the filtering portion is surrounded by the first sub-portion of the non-filtering portion, the first sub-portion of the non-filtering portion is entirely surrounded by the second sub-portion of the filtering portion, and the second sub-portion of the filtering portion is entirely surrounded by the second sub-portion of the non-filtering portion.

* * * * *